(12) United States Patent
Nakano et al.

(10) Patent No.: US 7,765,674 B2
(45) Date of Patent: Aug. 3, 2010

(54) MAGNET COVER CAULKING METHOD OF ELECTRIC MOTOR

(75) Inventors: Masami Nakano, Shizuoka (JP); Takayuki Kobayashi, Tochigi (JP)

(73) Assignee: Showa Corporation, Saitama (JP)

( * ) Notice: Subject to any disclaimer, the term of this patent is extended or adjusted under 35 U.S.C. 154(b) by 168 days.

(21) Appl. No.: 12/074,984

(22) Filed: Mar. 7, 2008

(65) Prior Publication Data

US 2009/0077788 A1 Mar. 26, 2009

(30) Foreign Application Priority Data

Sep. 26, 2007 (JP) ............................. 2007-250075

(51) Int. Cl.
*H02K 15/00* (2006.01)

(52) U.S. Cl. ...................... 29/596; 29/598; 310/156.22; 310/171

(58) Field of Classification Search ........... 29/596–598, 29/732–736, 895.22, 123; 310/89–91, 156.22, 310/270–271
See application file for complete search history.

(56) References Cited

U.S. PATENT DOCUMENTS

| 4,313,981 | A | * | 2/1982 | Namiki ...................... 427/409 |
| 4,746,827 | A | * | 5/1988 | Ochiai et al. ........... 310/156.22 |
| 4,918,802 | A | * | 4/1990 | Schaefer ...................... 29/598 |
| 5,563,463 | A | * | 10/1996 | Stark ...................... 310/156.28 |
| 5,970,294 | A | * | 10/1999 | Narita et al. ................. 399/286 |
| 6,342,739 | B1 | * | 1/2002 | Furuya et al. ......... 310/40 MM |
| 7,365,465 | B2 | * | 4/2008 | Ludwig ................. 310/156.12 |
| 2009/0077788 | A1 | * | 3/2009 | Nakano et al. ................. 29/596 |

FOREIGN PATENT DOCUMENTS

JP 2007001364 1/2007

\* cited by examiner

*Primary Examiner*—Minh Trinh
(74) *Attorney, Agent, or Firm*—Orum & Roth LLC (57) ABSTRACT

In a magnet cover caulking method of an electric motor, the method achieves caulking and fixation by forming a taper-shaped outer peripheral portion, a diameter of which is reduced toward an outer side in an axial direction, in an outer periphery of a magnet holder, arranging an annular caulking jig in an outer periphery of a rotating shaft, pressing a taper-shaped forming portion a diameter of which is increased toward an outer side in an axial direction, provided in one end side of an inner periphery of the caulking jig to a straight end portion of a magnet cover installed to the outer periphery of the magnet and the magnet holder from the axial direction, and forming the end portion of the magnet cover according to the taper-shaped outer peripheral portion of the magnet holder.

2 Claims, 9 Drawing Sheets

MAGNET COVER CAULKING METHOD OF ELECTRIC MOTOR

BACKGROUND OF THE INVENTION

1. Field of the Invention

The present invention relates to a magnet cover caulking method of an electric motor which is preferably used in a motor-driven power steering apparatus or the like.

2. Description of the Related Art

In an electric motor used in a motor-driven power steering apparatus or the like as described in Japanese Patent Application Laid-Open No. 2007-1364 (patent document 1), a magnet is positioned and retained by providing the magnet in an outer periphery of a rotating shaft and providing a magnet holder in both end sides of the magnet in the outer periphery of the rotating shaft. A magnet cover is installed to an outer periphery of the magnet and the magnet holder so as to be fixed, thereby covering the magnet.

In the conventional electric motor, as a fixing method of the magnet cover, an end portion of the magnet cover installed to the outer periphery of the magnet and the magnet holder is roll caulked perpendicularly. Complicated roll caulking equipment is necessary and caulking time is long.

SUMMARY OF THE INVENTION

An object of the present invention is to easily caulk an end portion of a magnet cover using a magnet cover caulking method for an electric motor.

The present invention relates to a magnet cover caulking method of an electric motor in which a magnet is provided in an outer periphery of a rotating shaft of the electric motor. A magnet holder is provided in both end sides of the magnet in an outer periphery of said rotating shaft. A magnet cover is installed to an outer periphery of said magnet and said magnet holder, and both end portions of said magnet cover are caulked and fixed to an outer periphery of said magnet holder. The method comprises forming a taper-shaped outer peripheral portion a diameter of which is reduced toward an outer side in an axial direction, in the outer periphery of said magnet holder. An annular caulking jig is arranged in the outer periphery of the rotating shaft. A taper-shaped forming portion a diameter of which is increased toward an outer side in an axial direction, provided in one end side of an inner periphery of the caulking jig, is pressed to a straight end portion of said magnet cover installed to the outer periphery of said magnet and said magnet holder from the axial direction. The end portion of said magnet cover is shaped to match the taper-shaped outer peripheral portion of said magnet holder so as to caulk and fix.

BRIEF DESCRIPTION OF THE DRAWINGS

The present invention will be more fully understood from the detailed description given below and from the accompanying drawings which should not be taken to be a limitation on the invention, but are for explanation and understanding only.

FIGS. 3A to 3C show a caulking method in accordance with the present invention, in which

FIGS. 4A to 4C show the magnet cover, in which

FIGS. 5A to 5C show a caulking jig, in which

FIGS. 7A to 7D show a single part working step of the caulking apparatus, in which

FIGS. 10A to 10C show a caulked state of the magnet cover by the caulking apparatus, in which

DESCRIPTION OF THE PREFERRED EMBODIMENTS

Figure 1:
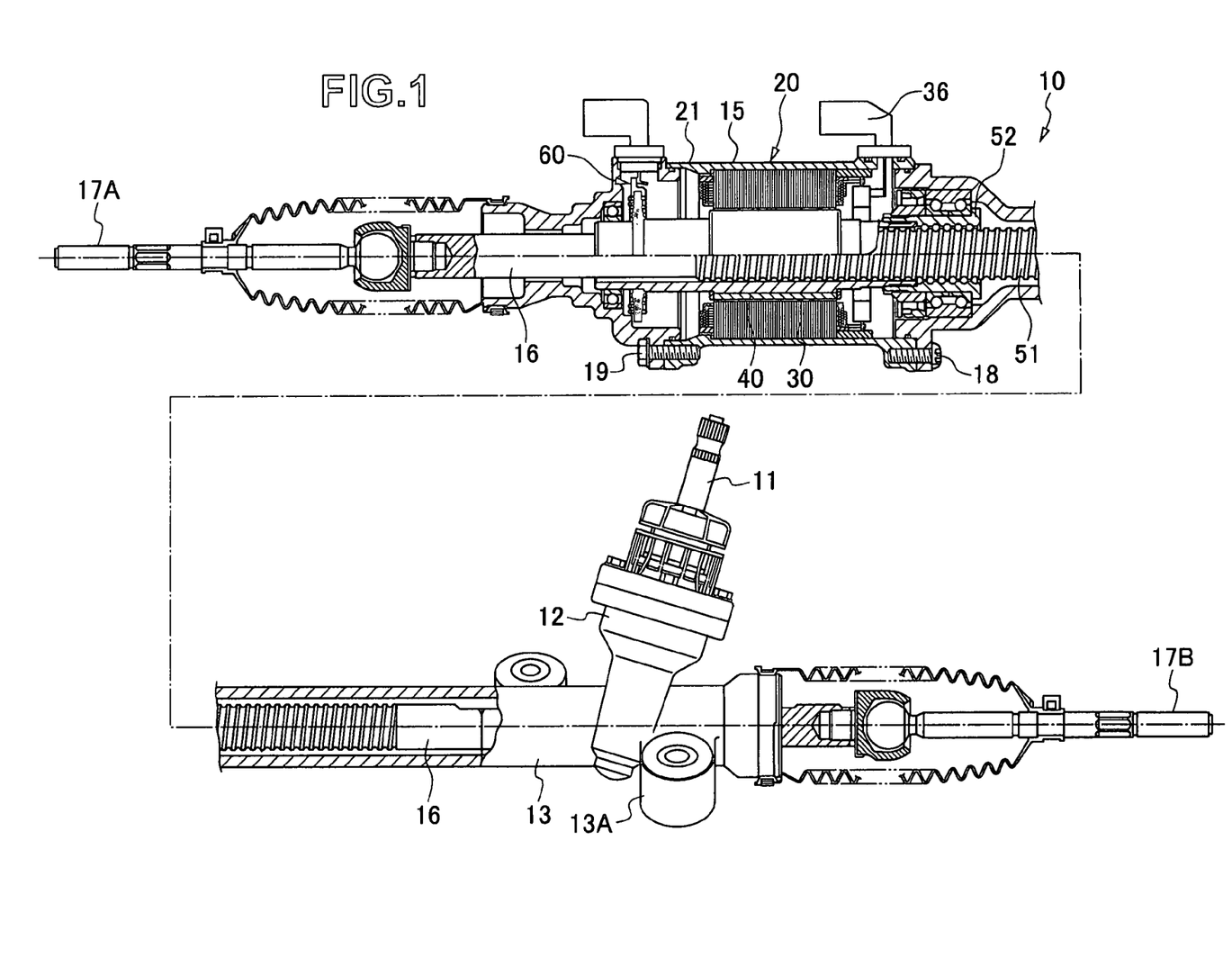
FIG. 1 is a general view showing a motor-driven power steering apparatus.
Figure 2:
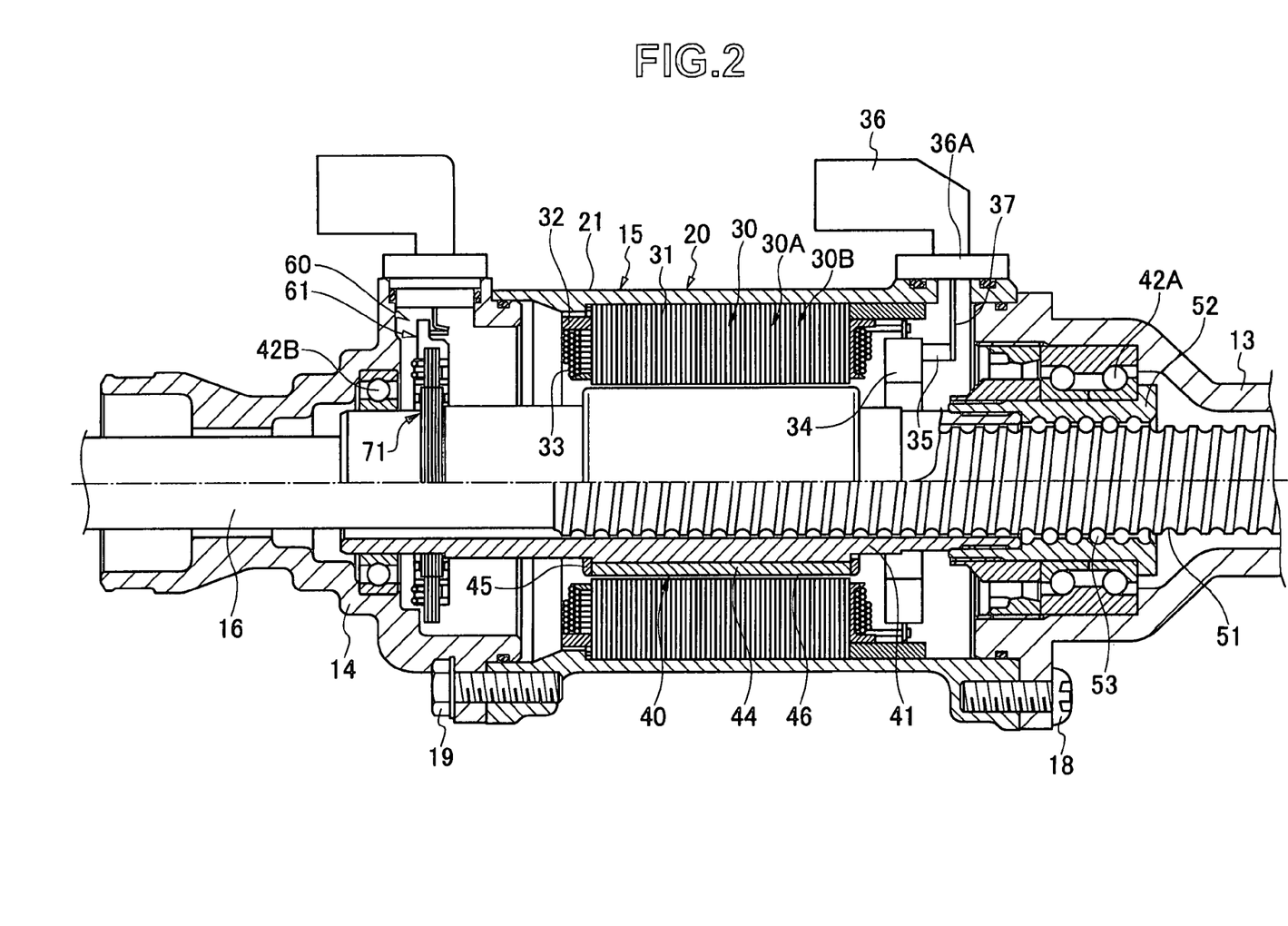
FIG. 2 is a cross sectional view of a main portion in FIG. 1.

A motor-driven power steering apparatus 10 has a gear box 12 supporting an input shaft 11 to which a steering wheel is coupled, and attaches the gear box 12 to a first housing portion 13, as shown in FIGS. 1 and 2. The first housing portion 13 has an attaching portion 13A to a vehicle body, and a second housing portion 14 is attached to the first housing portion 13 via a motor portion 15. Within the gear box 12, an output shaft (not shown) is coupled to the input shaft 11 via a torsion bar, and a steering torque detecting apparatus (not shown) is assembled between the input shaft 11 and the output shaft. A rack shaft 16 is inserted to the first housing portion 13, the second housing portion 14 and the motor portion 15 so as to be supported, and a rack gear of the rack shaft 16 is engaged with a pinion gear of the output shaft within the gear box 12 so as to form a rack and pinion mechanism, and is linearly moved in an axial direction in correspondence to operation of a steering wheel. In this case, tie rods 17A and 17B are coupled to both end portions of the rack shaft 16, and left and right wheels can be steered via the tie rods 17A and 17B on the basis of a linear movement of the rack shaft 16.

In the motor-driven power steering apparatus 10, a brushless motor 20 which is coaxial with the rack shaft 16 is structured by attaching a motor housing 21 made of an aluminum or the like to each of the first housing portion 13 and the second housing portion 14 by bolts 18 and 19 in such a manner as to construct a yoke of the motor portion 15. The brushless motor 20 (the electric motor) has a motor stator 30, a motor rotor 40 rotatably arranged in an inner peripheral side of the motor stator 30, and a resolver 60 detecting a rotational position of the motor rotor 40 with respect to the motor stator 30.

The motor stator 30 has a core assembly 30A structured by adjacently arranging a plurality of, for example, four in each of U-phase, V-phase and W-phase (totally twelve) in the present embodiment, core subassemblies 30B installed and fixed to an inner periphery of the motor housing 21 on a circumference, as shown in FIG. 2. The core subassembly 30B is structured by laminating a core 31 constituted by a plurality of silicon steel plates, attaching a resin bobbin 32 to the laminated core 31, and winding the motor coils 33 respectively forming three phases comprising the U-phase, the V-phase and the W-phase around the coil winding portion of the bobbin 32. Three feed terminals 35 (connected terminals) are connected to the terminals of the respective motor coils 33 via a bus ring (not shown) embedded in a resin portion 34 attached to the bobbin 32 in the present embodiment. Each of the feed terminals 35 is structured such as to be resin molded in a root portion connected to the bus ring. Each of one end protruded from a resin portion 36A of a connector terminal 37 (a connecting terminal) is welded in sequence for connecting each of the power supplies of the U-phase, the V-phase and the W-phase embedded in the resin portion 36A of the connector 36 so as to be drawn into the inner portion of the motor housing 21, to each of the portions protruding from the resin portion 34. The connector 36 is fixed to the motor housing 21.

The motor rotor 40 has a hollow rotating shaft 41 arranged around the rack shaft 16 over a longitudinal direction of the motor housing 21, as shown in FIG. 2. A ball nut 52 mentioned below is fixed to one end portion of the rotating shaft 41. The ball nut 52 is pressure inserted to the bearing 42A of the gear housing 13 so as to be pivoted, and the other end portion of the rotating shaft 41 is pressure inserted to the bearing 42B of the second housing portion 14 so as to be pivoted.

Figure 3A:
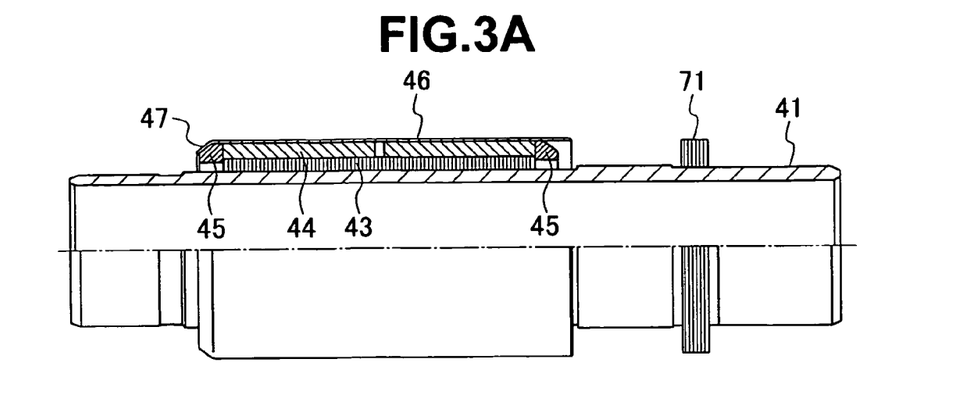
FIG. 3A is a cross sectional view showing an installed state of a magnet cover.
Figure 3B:
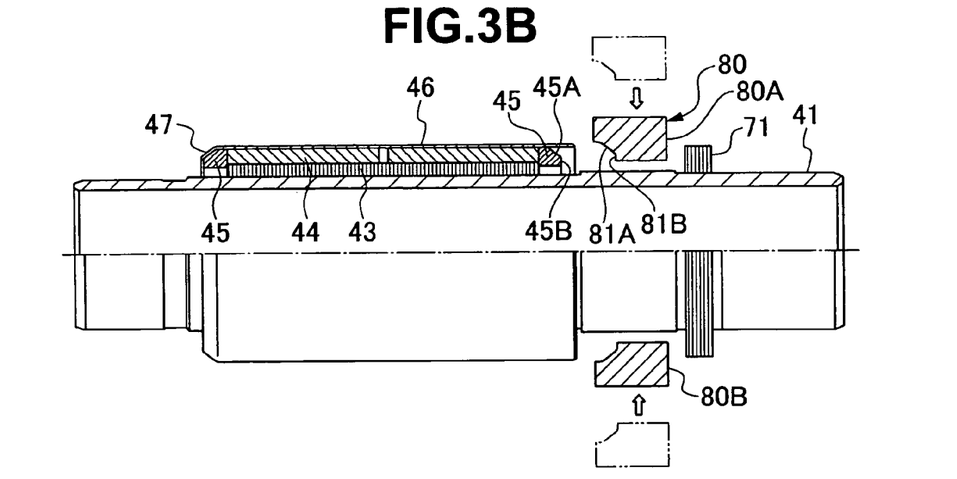
FIG. 3B is a cross sectional view showing an arranged state of a caulking jig.
Figure 3C:
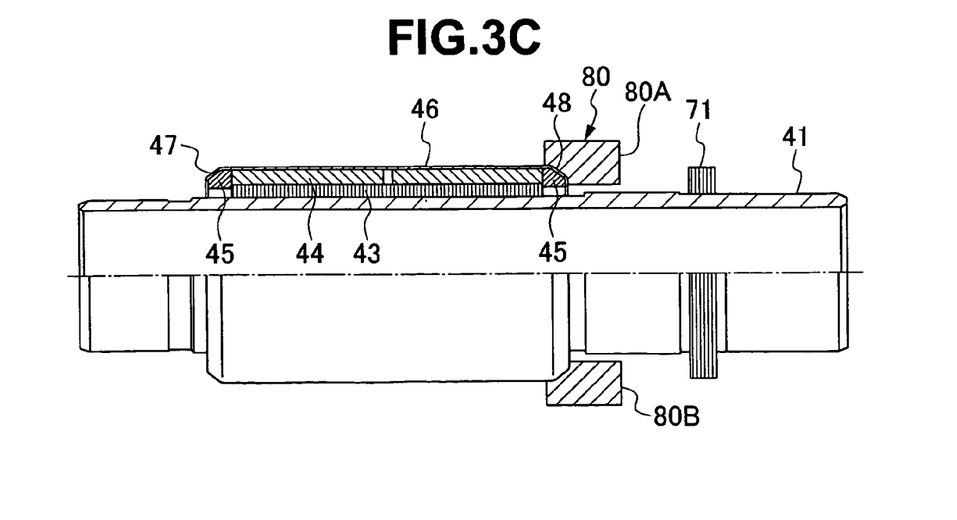
FIG. 3C is a cross sectional view showing a caulked state of the magnet cover.

The motor rotor 40 is structured, as shown in FIGS. 3A to 3C, such that a core 43 and a magnet 44 are provided at positions facing to the motor stator 30 in an outer periphery of the rotating shaft 41. The magnet 44 is positioned and fixed by magnet holders 45 provided in both end sides of the magnet 44 in the outer periphery of the rotating shaft 41 and made of a resin or a stainless steel. A thin cylindrical magnet cover 46 made of an aluminum or the like is installed to the outer periphery of the magnet 44 and the magnet holder 45, and both end portions of the magnet cover 46 are caulked and fixed to the outer periphery of the magnet holder 45.

The motor-driven power steering apparatus 10 is structured, as shown in FIG. 2, such that a ball screw 51 is provided in the rack shaft 16, and a ball nut 52 engaging with the ball screw 51 is fixed to one end portion of the rotating shaft 41 mentioned above. A steel ball 53 is retained between a thread groove of the ball screw 51 and a thread groove of the ball nut 52, and a rotation of the ball nut 52 is converted into a linear movement of the rack shaft 16 by the ball screw 51.

The resolver 60 is constituted by a resolver stator 61 assembled at a fixed position in a circumferential direction with respect to the motor stator 30, and a resolver rotor 71 assembled at a fixed position in the circumferential direction with respect to the motor rotor 40, as shown in FIG. 2. The resolver stator 61 is arranged so as to surround the resolver rotor 71 rotating together with the rotating shaft 41 of the motor rotor 40. A rotational position of the rotating shaft 41 with respect to the motor stator 30 is detected on the basis of a change of a reluctance generated between the resolver stator 61 and the resolver rotor 71 due to this rotation. A predetermined electric current is fed to each of the U-phase, V-phase and W-phase coils of the motor stator 30 by an external control circuit, in correspondence to the detected rotational position of the rotating shaft 41, and the motor 20 is driven and controlled.

Accordingly, the motor-driven power steering apparatus 10 is actuated as follows.

(1) When the steering torque detected by the steering torque detecting apparatus is lower than a predetermined value, steering assist force is not necessary, and the electric motor 20 is not driven.

(2) When the steering torque detected by the steering torque detecting apparatus exceeds a predetermined value, steering assist force is necessary. Accordingly, the electric motor 20 is driven. In the electric motor 20, the coil 33 of the motor stator 30 is excited in such a manner as to generate a necessary steering assist force, and the electric motor is driven such that the motor rotor 40 is rotated by the magnetic field generated by the motor stator 30. The generated torque of the motor 20 is transmitted to the ball nut 52 from the motor rotor 40 via the rotating shaft 41. The rotation of the ball nut 52 is changed to linear movement of the rack shaft 16 by the ball screw 51, and is applied as a steering assist force to the wheel working with the rack shaft 16.

A description will be given below of a caulking method for the magnetic cover 46 of the electric motor 20.

The electric motor 20 is provided with a taper-shaped outer peripheral portion 45A, a diameter of which is reduced toward an outer side in an axial direction, in the outer periphery of the magnet holders 45 which are provided in both end sides of the magnet 44 in the outer periphery of the rotating shaft 41. The magnet holder 45 is structured such that an end surface running into an outer end in an axial direction of the taper-shaped outer peripheral portion 45A is formed as a straight wall end surface 45B which is orthogonal to the axial direction. In this case, the magnet holder 45 is structured such that an outer peripheral surface running into an inner end in the axial direction of the taper-shaped outer peripheral portion 45A is formed as a straight outer peripheral surface having the same diameter as the outer peripheral surface of the magnet 44.

Figure 4A:
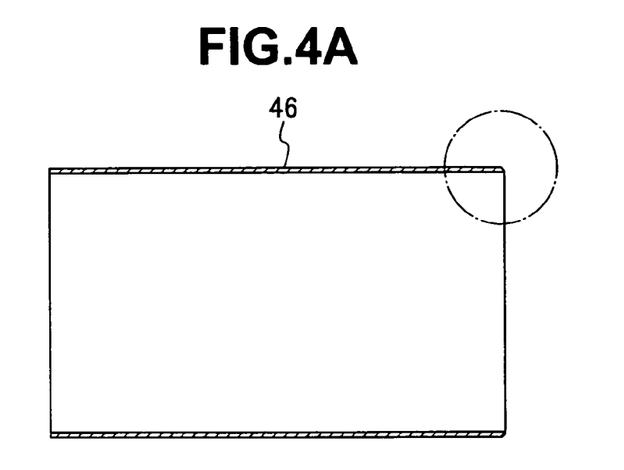
FIG. 4A is a cross sectional view before being caulked.
Figure 4B:
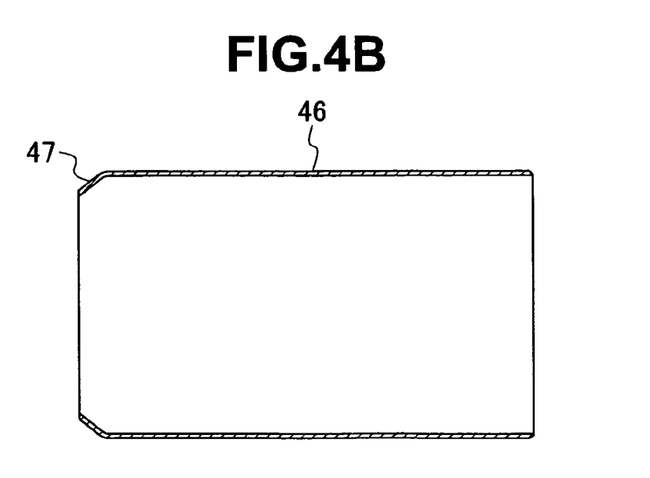
FIG. 4B is a cross sectional view showing a state in which one end portion is caulked.
Figure 4C:
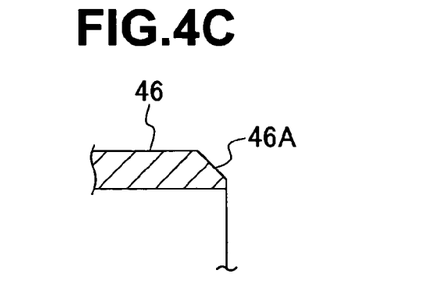
FIG. 4C is an enlarged cross sectional view showing a chamfered portion in a cutting edge portion.

The magnet cover 46 is previously provided with a chamfered portion 46A (FIG. 4C) in the outer periphery of the cutting edge portions in both sides of the thin cylinder body (FIG. 4A), and a base end portion is previously caulked so as to form a base end caulked portion 47 (FIG. 4B). The magnet cover 46 is installed to the outer periphery of the magnet 44 and the magnet holder 45 on the rotating shaft 41 so as to be caulked and fixed, in accordance with the following procedure.

(1) The magnet cover 46 is installed to the outer periphery of the magnet 44 and the magnet holder 45 on the rotating shaft 41 (FIG. 3A). In the magnet cover 46, the straight leading end portion is installed from an opposite side to the resolver rotor 71 in the axial direction of the rotating shaft 41. The base end caulked portion 47 of the base end portion is fitted and attached to the outer periphery of the magnet holder 45 in the opposite side to the resolver rotor 71.

Figure 5A:
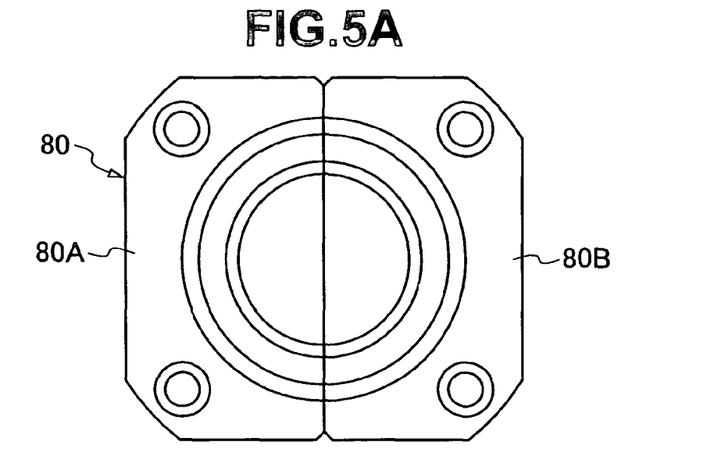
FIG. 5A is a front elevational view.
Figure 5B:
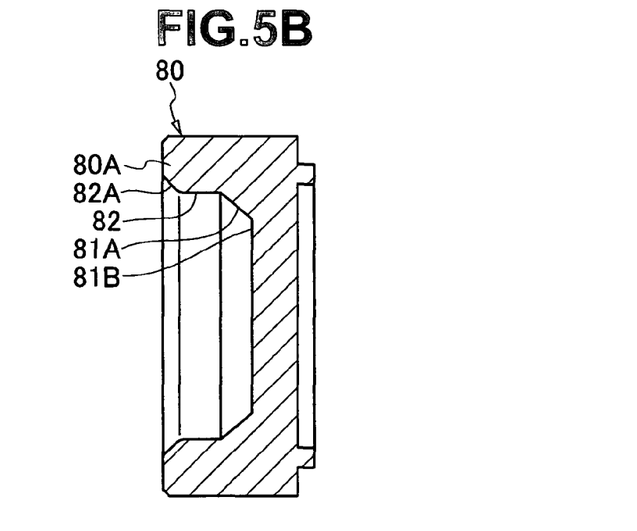
FIG. 5B is a half cross sectional view.
Figure 5C:
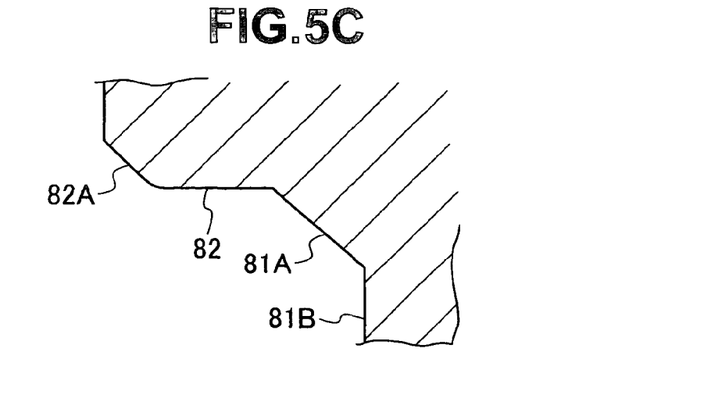
FIG. 5C is an enlarged view of a main portion in FIG. 5B.

(2) An annular caulking jig 80 is arranged in an outer periphery between the magnet holder 45 in the side of the resolver rotor 71 and the resolver rotor 71 in the outer periphery of the rotating shaft 41 (FIG. 3B). The caulking jig 80 is constituted by a plurality of, two in the present embodiment, half-shaped divided bodies 80A and 80B divided in the circumferential direction, as shown in FIGS. 5A to 5C. Each of the divided bodies 80A and 80B is introduced to a portion close to an outer periphery of the rotating shaft 41 from an outer side in a radial direction of the rotating shaft 41 so as to be arranged. Accordingly, the caulking jig 80 (80A and 80B) faces to the straight leading end portion (having the chamfered portion 46A) of the magnet cover 46 installed to the outer periphery of the magnet 44 and the magnet holder 45 on the rotating shaft 41 from the axial direction.

The caulking jig 80 is provided with a taper-shaped forming portion 81A a diameter of which is increased toward an outer side in the axial direction, in one end side of an inner periphery thereof. The caulking jig 80 is provided with a straight wall forming portion 81B which is orthogonal to the axial direction, so as to run into the inner end in the axial direction of the taper-shaped forming portion 81A. In this case, the caulking jig 80 is structured such that an inner peripheral surface running into an outer end in the axial direction of the taper-shaped forming portion 81A is formed as a straight fitting portion 82 fitted to the straight leading end portion of the magnet cover 46. An expanded introduction portion 82A is provided in an outer end side in the axial direction of the straight fitting portion 82.

(3) The leading end portion of the magnet cover 46 is caulked by the caulking jig 80 (FIG. 3C). The straight fitting portion 82 of the caulking jig 80 is fitted to the straight leading end portion (having the chamfered portion 46A) of the magnet cover 46 installed to the outer periphery of the magnet 44 and the magnet holder 45 on the rotating shaft 41 from the axial direction via the expanded introduction portion 82A provided in the outer end in the one end side of the caulking jig 80. Further, each of the taper-shaped forming portion 81A and the straight wall forming portion 81B provided in one end side of the caulking jig 80 is pressed to the straight leading end portion (having the chamfered portion 46A) of the magnet cover 46 installed to the outer periphery of the magnet 44 and the magnet holder 45 on the rotating shaft 41 from the axial direction. The leading end portion of the magnet cover 46 is formed according to each of the taper-shaped outer peripheral portion 45A and the straight wall end surface 45B of the magnet holder 45 so that a leading end caulked portion 48 is formed. The base end caulked portion 47 and the leading end caulked portion 48 of the magnet cover 46 are caulked and fixed to the magnet holders 45 and 45 in both sides on the rotating shaft 41.

In accordance with the present embodiment, the following operations and effects can be achieved.

(a) The structure is made such as to press the taper shaped forming portion 81A, a diameter of which is increased toward the outer side in the axial direction, provided in the one end side in the inner periphery of the caulking jig 80, to the straight end portion of the magnet cover 46 installed to the outer periphery of the magnet 44 and the magnet holder. 45 from the axial direction. The end portion of the magnet cover 46 is formed according to the taper shaped outer peripheral portion 45A of the magnet holder 45 so as to caulk and fix. Only simple caulking equipment is required for simply pressing the caulking jig 80 in the axial direction, and caulking time is short. Accordingly, mass production performance of the electric motor 20 is improved, and cost can be reduced.

(b) The structure is made such as to press each of the taper shaped forming portion 81A and the straight wall forming portion 81B of the caulking jig 80 to the straight end portion of the magnet cover 46 installed to the outer periphery of the magnet 44 and the magnet holder 45 from the axial direction. The end portion of the magnet cover 46 is formed according to each of the taper shaped outer peripheral portion 45A and the straight wall end surface 45B of the magnet holder 45 so as to caulk and fix. It is possible to form the end portion of the magnet cover 46 completely according to the outer periphery of the magnet holder 45, and it is possible to securely caulk and achieve improvement of the outer appearance.

(c) The caulking jig 80 is constituted by a plurality of divided bodies 80A and 80B divided in the circumferential direction. Each of the divided bodies 80A and 80B is introduced to the outer periphery of the rotating shaft 41 from the radial direction of the rotating shaft 41. If the resolver rotor 71 or the like is arranged near the magnet 44 on the rotating shaft 41, the annular caulking jig 80 can be arranged in the outer periphery of the rotating shaft 41 and the caulking motion and procedure can be carried out.

(d) The chamfered portion 46A is previously provided in the outer periphery of the cutting edge portion of the magnet cover 46. When pressing the taper-shaped forming portion 81A of the caulking jig 80 to the straight end portion of the magnet cover 46 from the axial direction so as to caulk, contact between the caulking jig 80 and the magnet cover 46 becomes smooth, and it is possible to caulk with a reduced likelihood of chipping.

Next, a description will be given of a caulking apparatus 100 used for carrying out the present invention.

Figure 6:
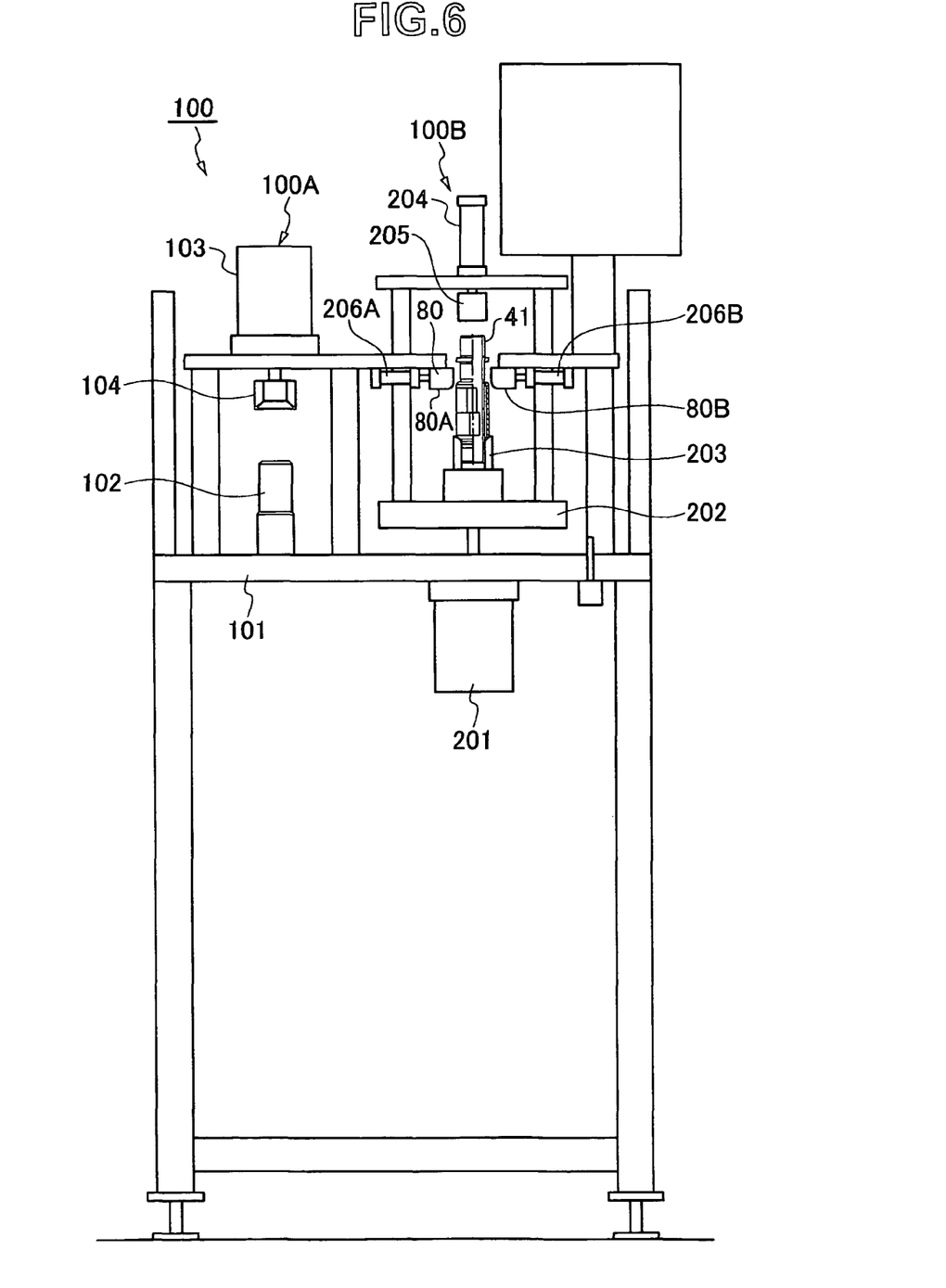
FIG. 6 is a front elevational view showing a caulking apparatus.

The caulking apparatus 100 is provided adjacently with a single caulking station 100A forming the base end caulked portion 47 in a simple substance in the magnet cover 46. An assembling and caulking station 100B assembles the magnet cover 46 in the outer periphery of the magnet 44 and the magnet holder 45 on the rotating shaft 41 so as to form the leading end caulked portion 48, as shown in FIG. 6.

The single caulking station 100A is provided with a caulking die 102 supported to a stand 101, and a caulking punch 104 moved up and down by a press-in cylinder 103 so as to be coaxially arranged.

The assembling and caulking station 100B is provided with a work receiving jig 203 installed on an elevating base 202 moved up and down by a press-in cylinder 201, and a pressing jig 205 pressurized by a pressing cylinder 204 so as to be arranged coaxially. The assembling and caulking station 100B has the caulking jig 80 divided into two pieces comprising the left and right divided bodies 80A and 80B, and is provided with moving cylinders 206A and 206B moving both the divided bodies 80A and 80B in an opposing manner.

The caulking motion by the single caulking station 100A and the assembling and caulking station 100B of the caulking apparatus 100 is as follows.

(A) Caulking motion of single caulking station 100A (FIGS. 7A to 7D)

Figure 7A:
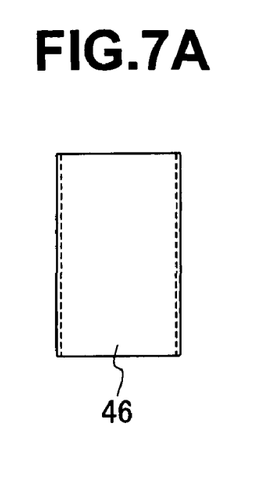
FIG. 7A is a front elevational view showing the magnet cover before being caulked.
Figure 7B:
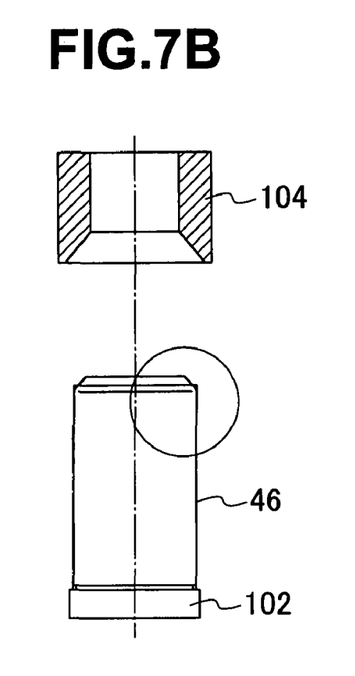
FIG. 7B is a front elevational view showing a caulking die and a caulking punch.

(1) The thin cylindrical magnet cover 46 in FIG. 7A is loosely inserted to the die 102 (FIG. 7B). The lower end portion of the magnet cover 46 is mounted to the lower end flange portion 102A of the die 102, and the upper end portion of the magnet cover 46 is positioned in the side of the upper end taper portion 102B of the die 102.

Figures 7C, 7D:
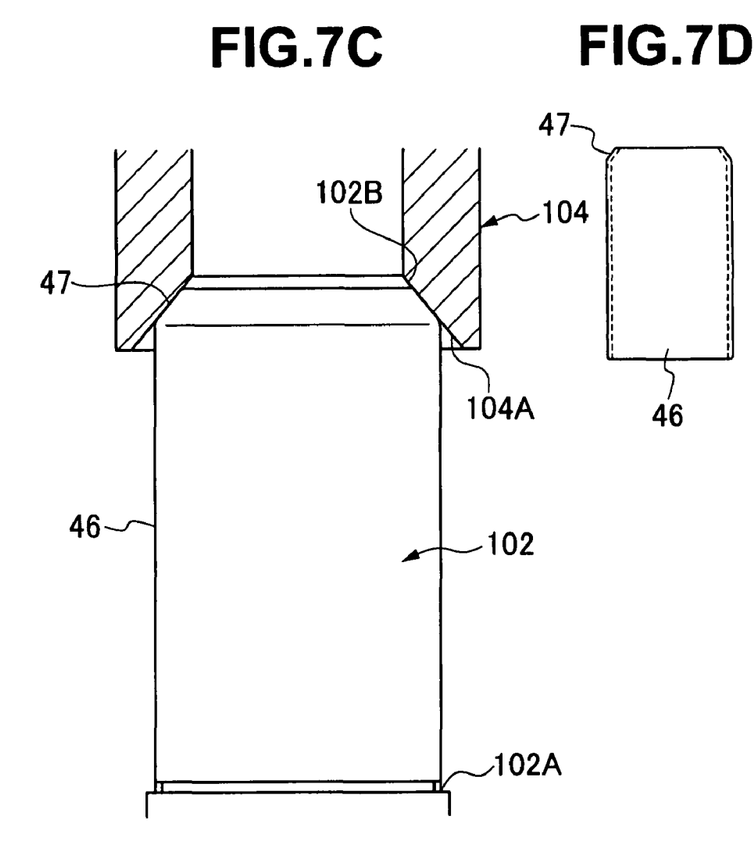
FIG. 7C is an enlarged front elevational view showing a caulking motion.
FIG. 7D is a front elevational view showing the magnet cover after being caulked.

(2) The punch 104 is moved down by the press-in cylinder 103. The base end caulked portion 47 is formed by pressing the taper-shaped forming portion 104A provided in the lower end side of the inner periphery of the punch 104 to the upper end portion of the magnet cover 46 in the item (1) mentioned above from the axial direction, and forming the upper end portion of the magnet cover 46 according to the upper end taper portion 102B of the die 102 (FIGS. 7C and 7D).

(B) Caulking motion of assembling and caulking station 100B (FIGS. 8 to 10C)

Figure 8:
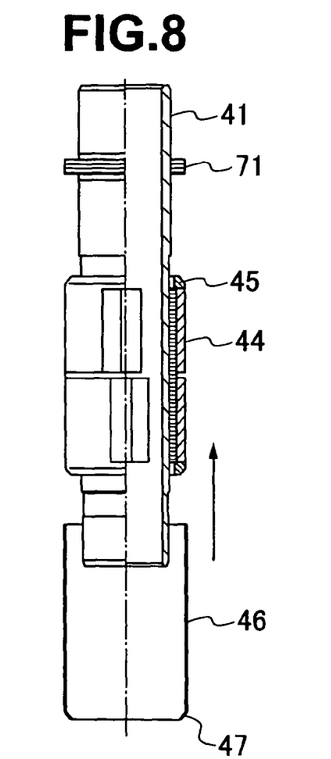
FIG. 8 is a cross sectional view showing an installed state of the magnet cover to the caulking apparatus.

(1) The magnet cover 46 is installed to the outer periphery of the magnet 44 and the magnet holder 45 on the rotating shaft 41 (FIG. 8). The magnet cover 46 is installed such that its straight leading end portion is positioned from the opposite side to the resolver rotor 71 in the axial direction of the rotating shaft 41.

Figure 9:
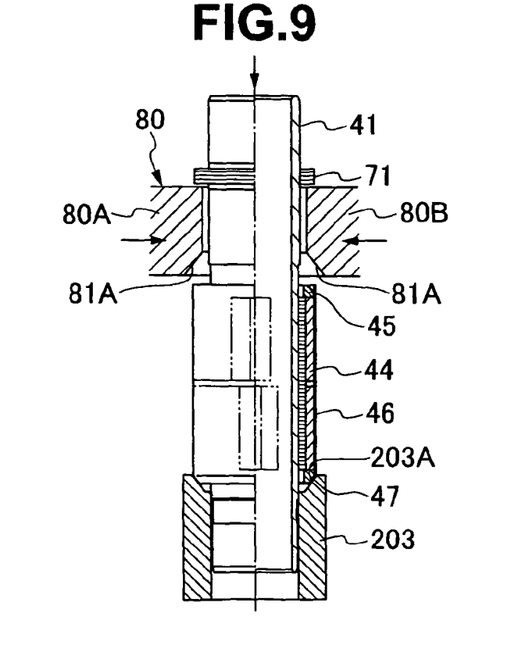
FIG. 9 is a cross sectional view showing an arranged state of the caulking jig in the caulking apparatus.

(2) The lower end portion of the rotating shaft 41 in the item (1) mentioned above is inserted to the work receiving jig 203, and the base end caulked portion 47 of the magnet cover 46 is mounted to the work receiving surface 203A of the work receiving jig 203 (FIG. 9). Subsequently, the pressing jig 205 pressurized by the pressing cylinder 204 is pressed to the upper end surface of the rotating shaft 41. The base end caulked portion 47 of the magnet cover 46 backed up by the work receiving surface 203A of the work receiving jig 203 is fitted and attached to the outer periphery of the magnet holder 45 in the opposite side to the resolver rotor 71 (FIG. 9).

Figure 10A:
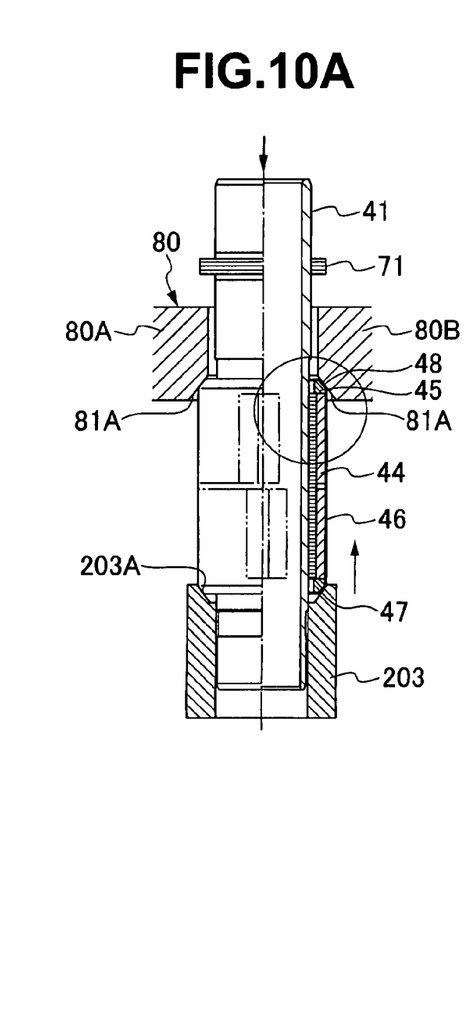
FIG. 10A is a cross sectional view.

(3) The divided bodies 80A and 80B of the caulking jig 80 are moved in an opposing manner by the moving cylinders 206A and 206B so as to be closed. The annular caulking jig 80 is arranged in the outer periphery between the magnet 45 in the resolver rotor 71 side and the resolver rotor 71, in the outer periphery of the rotating shaft 41 (FIG. 10A). Accordingly, the caulking jig 80 (80A and 80B) faces the straight leading end portion (having the chamfered portion 46A) of the magnet cover 46 installed to the outer periphery of the magnet 44 and the magnet holder 45 of the rotating shaft 41 from the axial direction.

Figure 10B:
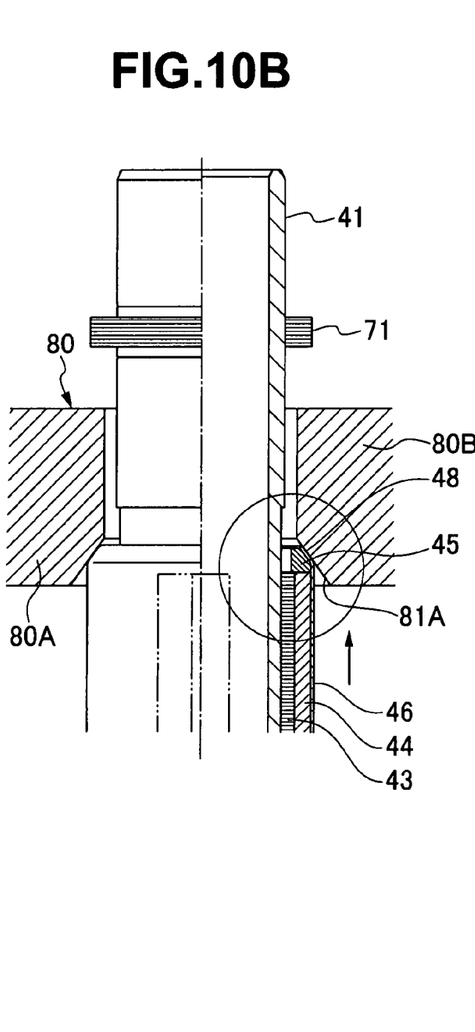
FIG. 10B is an enlarged cross sectional view of a main portion in FIG. 10A.
Figure 10C:
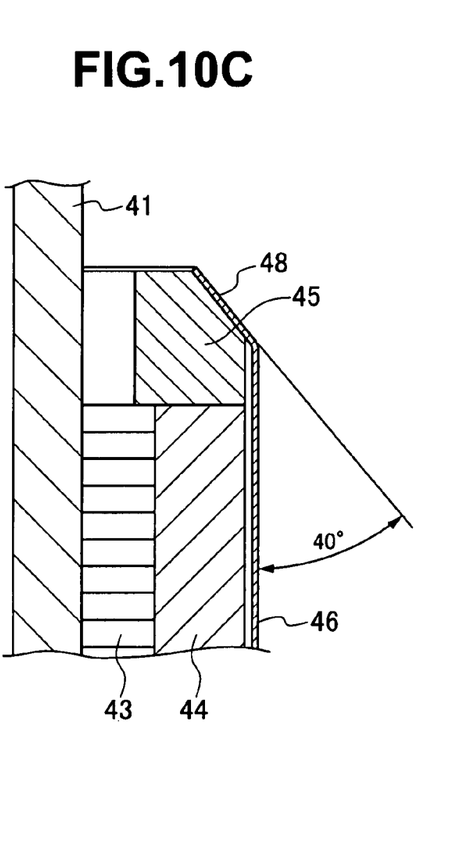
FIG. 10C is a cross sectional view showing a caulked portion of the magnet cover.

(4) The leading end portion of the magnet cover 46 is formed by the following steps. The work receiving jig 203 is moved up by the press-in cylinder 201. The magnet cover 46 is pushed up, and is backed up by the work receiving surface 203A of the work receiving jig 203 and the magnet 44 and the magnet holder 45 on the rotating shaft 41. The straight leading end portion (having the chamfered portion 46A) of the magnet cover 46 is pressed to the taper-shaped forming portion 81A of the caulking jig 80 from the axial direction, and the leading end portion of the magnet cover 46 is formed according to the taper-shaped outer peripheral surface 45A of the magnet holder 45 (FIGS. 10B and 10C). The base end caulked portion 47 and the leading end caulked portion 48 of the magnet cover 46 are caulked and fixed to the magnet holders 45 and 45 in both sides on the rotating shaft 41.

In this case, the caulking apparatus 100 may be structured, as shown in FIGS. 3A to 5C, such that the caulking jig 80 is provided with the straight wall forming portion 81B together with the taper-shaped forming portion 81A.

As heretofore explained, embodiments of the present invention have been described in detail with reference to the drawings. However, the specific configurations of the present invention are not limited to the embodiments but those having a modification of the design within the range of the present invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A magnet cover caulking method for an electric motor, comprising: providing a magnet in an outer periphery of a rotating shaft of the electric motor, providing a magnet holder in both end sides of the magnet in an outer periphery of said rotating shaft, installing a magnet cover to an outer periphery of said magnet and said magnet holder, and caulking and fixing both end portions of said magnet cover to an outer periphery of said magnet holder, forming a taper-shaped outer peripheral portion a diameter of which is reduced toward an outer side in an axial direction, in the outer periphery of said magnet holder; arranging an annular caulking jig in the outer periphery of the rotating shaft, pressing a taper-shaped forming portion a diameter of which is increased toward an outer side in an axial direction, provided in one end side of an inner periphery of the caulking jig, to a straight end portion of said magnet cover installed to the outer periphery of said magnet and said magnet holder from the axial direction, and forming the end portion of said magnet cover according to the taper-shaped outer peripheral portion of said magnet holder so as to caulk and fix, providing said magnet holder with a straight wall end surface which is orthogonal to the axial direction, so as to run into an outer end in the axial direction of said taper-shaped outer peripheral portion, providing said caulking jig with a straight wall forming portion which is orthogonal to the axial direction, so as to run into an inner end in the axial direction of said taper-shaped forming portion, caulking and fixing by pressing each of the taper-shaped forming portion and the straight wall forming portion to the straight end portion of said magnet cover installed to the outer periphery of said magnet and said magnet holder from the axial direction, forming the end portion of said magnet cover according to each of the taper-shaped outer peripheral portion and the straight wall end surface of said magnet holder, providing said caulking jig having a plurality of divided bodies divided in a circumferential direction, and introducing to arrange each of the divided bodies to an outer periphery of said rotating shaft from a radial direction of the rotating shaft, and providing a chamfered portion in an outer periphery of a cutting edge portion of said magnet cover.

2. The magnet cover caulking method of an electric motor according to claim 1, further comprising the steps of providing a caulking jig having an inner peripheral surface running into an outer end in the axial direction of the taper-shaped forming portion formed as a straight fitting portion fitted to the straight end portion of said magnet cover, and providing an expanded introduction portion in an outer end side in the axial direction of said straight fitting portion.

* * * * *